Sept. 6, 1938.  J. E. GLEASON  2,129,056
GEAR CUTTER
Filed Jan. 15, 1937  2 Sheets-Sheet 1
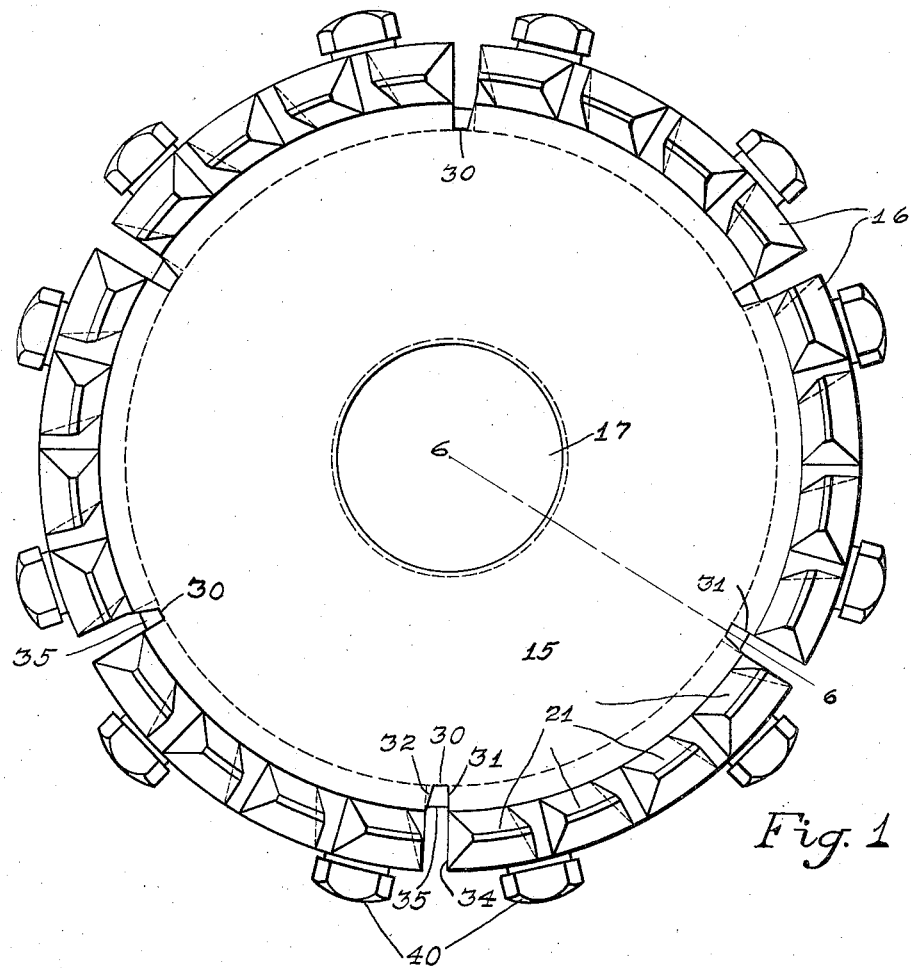
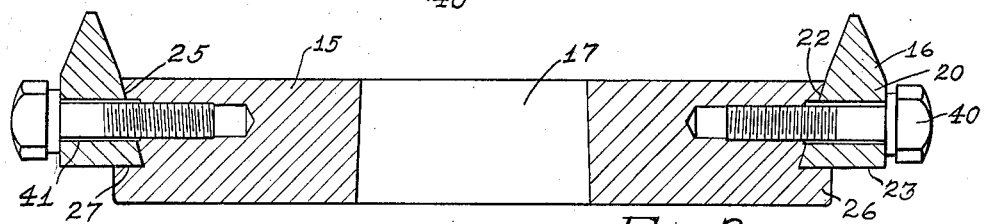
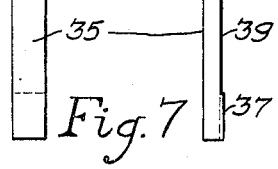
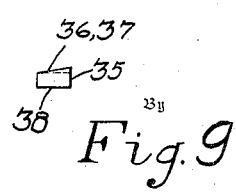
Inventor
James E. Gleason
By B. W. Schlesinger
Attorney Sept. 6, 1938.  J. E. GLEASON  2,129,056
GEAR CUTTER
Filed Jan. 15, 1937  2 Sheets-Sheet 2

James E Gleason
Inventor

B. F. Shlesinger
Attorney

Patented Sept. 6, 1938

2,129,056

UNITED STATES PATENT OFFICE 2,129,056

GEAR CUTTER

James E. Gleason, Rochester, N. Y., assignor to Gleason Works, Rochester, N. Y., a corporation of New York Application January 15, 1937, Serial No. 120,728

33 Claims. (Cl. 29—105)

The present invention relates to gear cutting tools and particularly to gear cutting tools of the face-mill type for cutting longitudinally curved tooth gears such as spiral bevel and hypoid gears.

At the present time, the form of face-mill gear cutter in common use is the inserted-blade type of cutter. The number of cutting blades which can be mounted in such a cutter is limited, however, for a given diameter of cutter. A certain minimum amount of stock must be left in the cutter head between successive blade slots to give the head the requisite strength and, then, too, there is always the problem, where a large number of inserted blades are to be used, of how to secure the blades in the cutter head without unduly weakening the cutter head by a great number of bolt holes.

At various times, attempts have been made to make face-mill gear cutters that would have a greater number of cutting blades. Thus it has been proposed to clamp the blades frictionally in the cutter head, to use a single bolt and strap to clamp a pair of blades, etc. None of these attempts have proved successful, however, because the blades could not be held securely enough, or kept true. Moreover, with such proposals as have heretofore been made, the number of cutting blades which might be secured in a head have been very definitely limited.

Attempts have also been made to secure a greater number of cutting teeth by making the cutting blades integral with the cutter head or by making the cutter blades integral with a ring which may be secured to the cutter head.

A cutter in which the blades are integral with the head is, however, an expensive tool because the cutter blades must be made of high-speed steel and where the blades are integral with the head, the head must be made of high-speed steel also. Moreover, it is difficult to harden such a cutter without distortion.

The ring-type cutter is difficult to hold in shape. There is a tendency for the ring to distort in hardening and, moreover, when bolting the ring to the head, it is difficult to keep the ring true within the very small tolerances allowable in present day gear production.

The primary purpose of the present invention is to provide a practical, yet economical form of face-mill gear cutter which will have a greater number of cutting edges than previous forms of such cutters.

A further object of the invention is to provide a face-mill gear cutter having a great number of cutting teeth, in which the cutting blades or teeth may be assembled quickly and accurately and rigidly upon the cutter head.

Other objects of the invention will be apparent hereinafter from the specification and from the recital of the appended claims.

The cutter of the present invention in its present preferred form comprises a plurality of cutting segments which are bolted or otherwise secured to a rotary head. Each of the segments has a plurality of integral cutting teeth which, as in the ordinary face-mill gear cutter, project beyond one side face of the head in the general direction of the axis of the head. Positioning means are provided to accurately locate the segments angularly and axially on the head. The segments may have all inside or all outside cutting teeth or part inside and part outside cutting teeth. The invention is applicable to cutters where the cutting teeth are arranged around the full periphery of the cutter head as well as to cutters of the "single-cycle" type where the cutting teeth are arranged only part-way around the periphery of the head and there is a gap between the last and first teeth to permit indexing of the blank. Various other modifications of the invention will suggest themselves to those skilled in the art.

In the drawings:

Fig. 1 is a plan and Fig. 2 a transverse sectional view of a face-mill gear cutter constructed according to one embodiment of this invention and having cutting teeth arranged around its full periphery;

Figs. 7, 8 and 9 are end, side and plan views, respectively, of one of the positioning members employed for locating the segments angularly in the cutter head.

Figure 3:
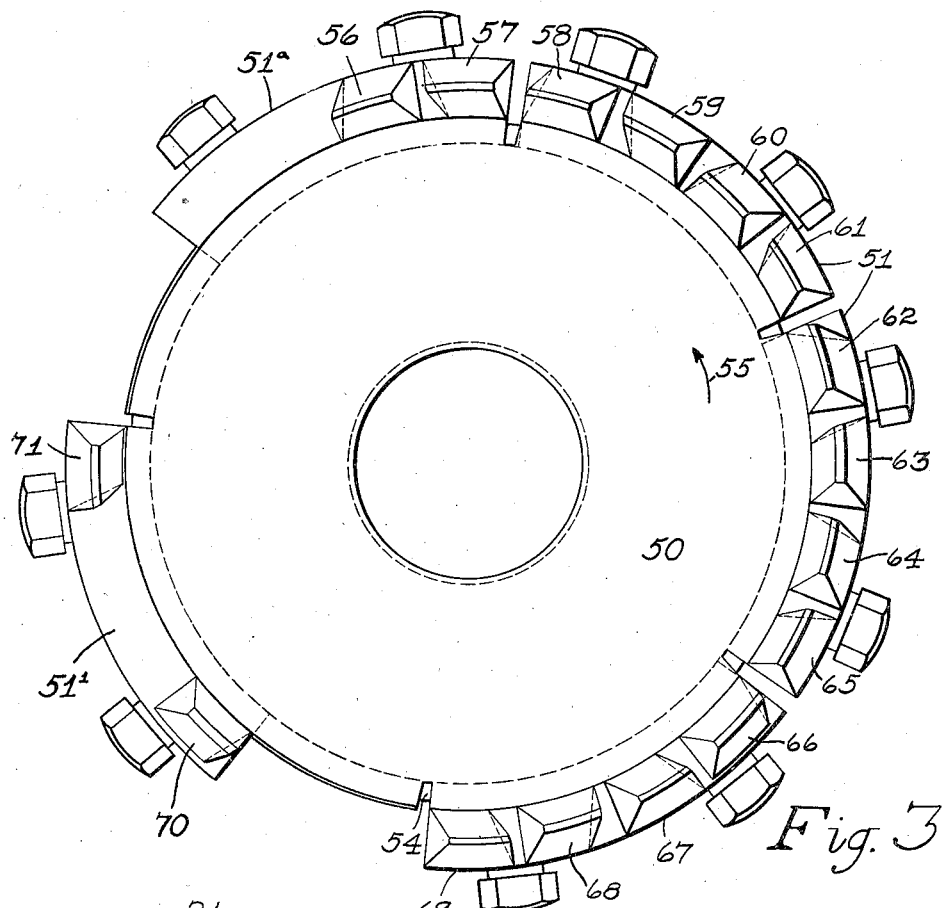
Fig. 3 is a plan view of a face-mill gear cutter of the "single-cycle" type constructed according to this invention and having cutting teeth arranged only part-way around its periphery.

Reference will be had first to the cutter of Figs. 1 and 2. This cutter comprises the rotary head 15 and a plurality of cutting segments 16. The cutter head has a central bore 17 for mounting it upon the cutter spindle of a gear cutting machine.

Each of the segments comprises a body portion 20 and a plurality of cutting teeth 21 which are integral with the body portion. The segments are arcuate in shape. The inside surfaces of the body portions of the segments are conical surfaces 22 which are coaxial with the cutter head and preferably ground. The bottom surfaces 23 of the segments are plane surfaces and preferably ground.

Figure 4:
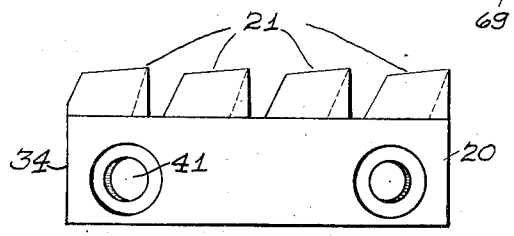
Figs. 4 and 5 are side elevations of segments of the cutters of Figs. 1 and 3, respectively.
Figure 5:
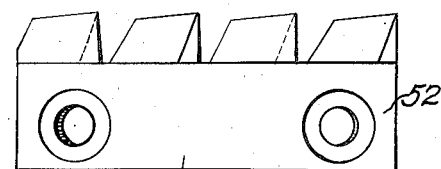

The cutting teeth 21 of the segments may be formed in any usual or suitable manner to provide side cutting edges. In the embodiment shown in Figs. 1, 2 and 4, the front faces of all of the teeth of the segments are sharpened so that the cutting teeth all have outside cutting edges and the cutter shown is a cutter such as may be employed in finish-cutting the concave side tooth surfaces of a spiral bevel or hypoid pinion. The cutting teeth are provided with clearance on their top and one or both side surfaces so as to cut cleanly and for this purpose they may be ground according to standard practice in relieving the top and side surfaces of blades of inserted-blade face-mill gear cutters. The cutting teeth may also be sharpened according to standard practice and on standard machines for sharpening face-mill gear cutters of the inserted-blade type.

The cutter head has a ground conical peripheral surface 25 which is coaxial of the head and which has the same cone angle as the cone angle of the inside surfaces of the body portions of the cutting segments. This conical surface does not extend the full depth of the cutter head, but for only a portion of the depth of the head and there is a ledge or rest 26 left, the upper surface 27 of which is ground plane to provide a seat for the cutting segments. This surface 27 is perpendicular to the axis of the cutter head. When the segments are positioned on the head, then, their plane bottom surfaces 23 seat upon the plane top surface 27 of the ledge or rest 26 and their conical inside surfaces 22 seat against the conical peripheral surface 25 of the head, and the cutting teeth 21 of the segments project beyond the adjacent side face of the head in the general direction of the axis of the head.

It is necessary to position the segments accurately angularly on the cutter head because the cutting teeth are sharpened by indexing the cutter to bring the cutting teeth successively into engagement with the sharpening grinding wheel and if one of the segments were to be displaced angularly from its correct angular relation to the other segments, the teeth of that segment would not be indexed into the correct position for sharpening with the result that the teeth of that segment would be ground back too much or too little with reference to the teeth of the other segments. If they were ground back too little, they would project beyond the teeth of the other segments and do all of the work of cutting while if they were ground back too much, their cutting edges would lie within the teeth of the other segments and would not do their share of the work.

For positioning the segments angularly, various means may be employed. Preferably, as shown, the cutter head is provided with a series of accurately spaced slots or grooves 30, the sides of which are ground and one side 31 of each of which is ground as a plane surface radial of the axis of the cutter head. The other side surface of each slot may also be ground as a plane surface but may be offset from the axis of the cutter head, as shown.

Figure 6:
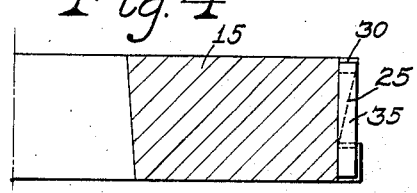
Fig. 6 is a sectional view on the line 6—6 of Fig. 1 or a corresponding section of the cutter shown in Fig. 3.

One end surface 34 of the body portion 20 of each segment is ground as a plane surface. Keys 35 are employed for locating the segments angularly on the cutter head. The keys engage in the slots 30 of the cutter head. Each key is formed with a plane side surface 38 and has plane-surfaced contact portions 36 and 37 at the other side. The contact portions 36 and 37 lie in the same plane and this plane is at the same angle to the plane of the opposite side 33 of each key as the angle between the plane sides 31 and 32 of the slots 30 of the cutter head. The plane side 38 of each key is adapted to engage and seat against the radial plane side surface 31 of a slot 30 of the cutter head and is adapted to engage and seat against the plane end face 34 of the body portion 20 of a segment. Each key is recessed, as indicated at 39, on its opposite side so that the opposite side of the key does not have contact with the body portion of the cutting segment and the key only engages the side 32 of the slot 30, at this side of the key, through the contact portions 36 and 37. Thus, the plane side 38 of the key acts as a positioning means locating the plane end surface 34 of each segment accurately with reference to the plane radial face 31 of a groove of the cutter head, as clearly shown in Fig. 6. The keys may be welded or otherwise secured in position.

The segments 16 are therefore accurately positioned angularly on the cutter head. They are secured in position by bolts 40 which thread into the cutter head. In the embodiment of the invention shown in Fig. 1, there are four cutting teeth to each segment and a pair of bolts 40 are employed to bolt each segment to the head.

In the standard type of inserted-blade face-mill gear cutter, there is a bolt required for each cutter blade to secure the cutter blade in the cutter head. The cutter head of the present invention will be stronger, then, than a face-mill gear cutter of the inserted-blade type for an equal number of cutting edges because of the reduction in the number of bolt holes required in the cutter head and a cutter made according to the present invention can have a great many more cutting edges than a standard type of inserted blade cutter without weakening the cutter head.

Standard face-mill type finishing cutters of nine inch diameter, for instance, have sixteen blades, eight inside blades and eight outside blades. The best previous attempt to make a multi-bladed cutter was one in which twenty-eight blades were mounted in a nine inch head by holding those blades in by friction contact of specially shaped bolts with opposite sides of adjacent blades but this cutter did not prove successful in practice. With the present invention, it has been found possible to provide forty cutting teeth on a nine inch diameter cutter.

Because of the greater number of cutting teeth, a cutter made according to the present invention can be used a longer time between sharpenings and a better tooth surface finish can be obtained or a faster feed can be employed in the cutting of gears without decreasing the life of the teeth between sharpenings or the quality of tooth-surface finish obtained. Further than this, a cutter head made according to the present preferred embodiment of the present invention is stronger than a cutter head of the inserted-blade type because it does not have any slots in it for cutter blades. Moreover, it is cheaper to make because its peripheral surface can be turned and ground on a cylindrical grinding machine and it has only one slot to be ground for a plurality of cutting teeth, one slot for each segment, instead of one slot to be ground for each cutting blade.

The bolt holes 41 in the segments for the bolts 40 are made slightly larger than the bolts so that the segments can be adjusted slightly angularly as required in inserting the positioning keys 35 before the bolts are tightened. An additional advantage of using conical inside surfaces on the segments and a conical peripheral surface on the cutter head is that as the bolts 40 are tightened up, the segments are drawn down on their seats 27 and very accurate axial positioning of the cutting teeth is obtained. It has been found that if the cone angle of the side surfaces of the segments and of the cutter head is made about 17°, there is a very desirable downward component of motion on the segments, tending to seat the segments axially, when the bolts 40 are tightened up.

In Fig. 3, I have shown how the present invention may be applied to the construction of a face-mill gear cutter intended to operate according to the principle of operation of the cutter shown in the McMullen et al. application, Serial No. 71,588, filed March 30, 1936. This type of cutter is commonly known as a "single-cycle" cutter. It is intended to finish-cut a previously roughed gear blank and it has a plurality of roughing teeth to remove stock left after the roughing operation and a final finishing tooth or teeth to produce the finished tooth surfaces and there is a gap between the last tooth and the first tooth to permit indexing the gear blank when this gap is abreast of the blank.

This cutter like the cutter already described comprises a rotary head 50 and a plurality of cutting segments 51. The segments 51 have body portions 52 whose inside surfaces are ground conical and coaxial of the cutter head, as in the cutter previously described. The cutter head has a ground conical peripheral surface and a plane seat, just as in the cutter previously described, and the segments are secured to the cutter head and positioned accurately angularly by keys 54, just as in the cutter previously described. The only difference between the cutter of Fig. 3 and the cutter of Fig. 1 is in the way the cutting teeth of the cutter of Fig. 3 are formed and the segments located angularly on the cutter head so as to position the cutting teeth to obtain the "single-cycle" cutting action.

The teeth of the cutter shown in Fig. 3 are sharpened so that alternate teeth have inside and outside cutting edges, respectively. The cutter is intended to rotate in the direction of the arrow 55 and the cutting tooth 56 is the first tooth to enter a tooth slot of the gear blank in the cutting operation. The inside cutting teeth 56, 58, 60, etc. are so formed that their inside cutting edges are at successively decreasing distances from the axis of the cutter head and the outside cutting teeth 57, 59, 61, etc. are so formed that their outside cutting edges are at successively increasing distances from the axis of the cutter head. Thus, the final inside and outside cutting teeth 70 and 71 are the finishing teeth and the preceding teeth 56 to 69 inclusive are stocking teeth simply removing the stock left after the roughing operation and leaving only a thin film of stock to be removed by the finishing blades. However, the teeth 68 and 69 may also be made finishing teeth in which case the cutting edges of the teeth 70 and 71 will be made to lie at the same radial distances, respectively from the axis of the cutter as do the cutting edges of the teeth 68 and 69, respectively.

It has been found preferable to arrange the cutting teeth so that when the finishing cut is being taken, only one finishing tooth will be in the tooth slot of the gear being cut. For this reason, the segment 51' which carries the cutting teeth 70 and 71 is preferably positioned angularly on the cutter head 50 so that the cutting tooth 70 is at a greater distance from the cutting tooth 69 than the face-width of the gear to be cut and the cutting tooth 71 is spaced angularly from the cutting tooth 70 at a greater distance than the face-width of the gear to be cut. Thus, the segment 51' in the embodiment of the invention shown, has only two cutting teeth 70 and 71.

The first tooth 56 of the cutter is spaced angularly from the last tooth 71 of the cutter a distance sufficient to permit of indexing of the blank while this space between the blades 71 and 56 is abreast of the blank. This is the reason why in the embodiment shown, there are only two cutting teeth 56 and 57 on the first segment 51a of the cutter.

Figure 10:
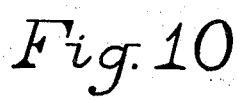
Fig. 10 is a diagrammatic view illustrating the method of operation of the cutter shown in Fig. 3.

The cutter of Fig. 3 operates in exactly the same manner as the cutter disclosed in the McMullen et al. application referred to above. The first cut is taken by the tooth 56 on the convex side of a slot of a gear 75 being cut (Fig. 10). The next cut is taken by the tooth 57 on the opposite side of the slot. Successive cutting teeth, 58, 59, etc. then cut alternately on opposite sides of the tooth slot as the cutter head rotates, successively widening the slot until the final finishing cuts are taken by the blades 70 and 71. Then in the gap between the blades 71 and 56, the blank is indexed.

Aside from the advantages already pointed out, cutters made according to the present invention are stronger than inserted blade cutters because the cutting teeth are integral with the segments and support one another. Further, the cutters are more accurate and operate more accurately. The cutting teeth of the segments can be accurately ground in correct relation to one another and when positioned on the cutter head, this accurate relationship is maintained. The blades of a face-mill gear cutter of the inserted-blade type have to be individually shimmed and adjusted by wedges to obtain correct radial position. This requires much more time than the assembly of segments on a cutter head made according to the present invention and, moreover, is difficult to effect accurately.

The cutter of Fig. 3 has all the advantages pointed out above and inherent in a segmental type cutter constructed according to the present invention and in addition, has an advantage as regards location of the cutting teeth relative to one another which is of distinct value in a cutter of the "single-cycle" type. In the cutter of Fig. 3, the final finishing teeth 70 and 71 for cutting opposite sides of a tooth space are integral with one another and can be located accurately relative to one another in a grinding operation. In a "single-cycle" cutter of the inserted-blade type, such as shown in the McMullen et al. application, the final finishing blades are located relative to one another by use of shims and wedges and the accuracy of location of the final finishing blades depends upon the manual skill of the operator.

While the invention has been illustrated in connection with two particular embodiments thereof, it will be understood that it is capable of further use. Thus, while it has been shown in connection with cutters in which the cutting segments are mounted upon the periphery of the cutter heads, it will be obvious that it may also be employed in connection with the manufacture of cutters in which the cutting teeth are secured to the inside surface of a head, as, for instance, the outside cutter of a pair of eccentric cutters, such as shown in the pending application of Leonard O. Carlsen, Serial No. 130,140, filed March 10, 1937. In this case, the segments will be secured to the inside of the cutter head or ring and they may have outside conical surfaces to fit the inside conical surface of the ring.

Further, while the invention has been illustrated in connection with cutter heads having an integral rest or ledge for axially positioning the cutting teeth, it will be understood that a separate plate might be employed instead, and the plate secured to the head as in known types of face-mill cutters.

Other modifications of the invention will suggest themselves to those skilled in the art. The present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A face-mill gear cutter comprising a rotary head and a plurality of cutting segments, each of the segments having a plurality of cutting teeth which project beyond one side face of the head in the general direction of the axis of the head, means for positioning said segments angularly about the axis of the head, and means for securing the segments to the head.

2. A face-mill gear cutter comprising a rotary head and a plurality of cutting segments, each of said segments having a plurality of cutting teeth which project beyond one side face of the head in the general direction of the axis of the head, means for positioning the segments angularly and axially on the head, and means for securing the segments to the head.

3. A face-mill gear cutter comprising a rotary head and a plurality of cutting segments, each of the segments having a plurality of cutting teeth which project beyond one side face of the head in the general direction of the axis of the head, said head having a plurality of slots, one for each segment, means engageable in each of said slots and adapted to engage a segment to position the segment angularly about the axis of the cutter head, and means for securing the segments to the cutter head.

4. A face-mill gear cutter comprising a rotary head and a plurality of cutting segments, each of the segments having a plurality of cutting teeth which project beyond one side face of the head in the general direction of the axis of the head, said head having a plurality of slots, one for each segment and each of said slots having a plane side surface radial of the axis of the head, each of said segments having a plane end face, a key engageable in each slot and having a plane side face adapted to engage both the radial side of the slot and the plane end face of the segment to position the segment angularly on the cutter head, and means for securing the segments to the head.

5. A face-mill gear cutter comprising a rotary head and a plurality of cutting segments, each of said segments having a body portion adapted to be secured to the head and a plurality of cutting teeth which are integral with the body portion and are adapted to project beyond one side face of the head in the general direction of the axis of the head, the body portion of each segment having a side surface shaped as a surface of revolution coaxial with the head and the head having a side seating-surface coaxial with the head against which the side surface of the body portions of the segments are adapted to seat, means for positioning the segments angularly about the axis of the head, and means for securing the segments to the head.

6. A face-mill gear cutter comprising a rotary head and a plurality of cutting segments, each of the segments having a body portion adapted to be secured to the head and a plurality of cutting teeth which are integral with the body portion and are adapted to project beyond one side face of the head in the general direction of the axis of the head, the body portion of each segment having a conical side surface coaxial with the axis of the head and said head having a conical side seating-surface coaxial with the head against which the conical side surfaces of the segments are adapted to seat, means for positioning the segments axially on the head, and means for securing the segments to the head.

7. A face-mill gear cutter comprising a rotary head and a plurality of cutting segments, each of the segments having a body portion adapted to be secured to the head and a plurality of cutting teeth which are integral with the body portion and are adapted to project beyond one side face of the head in the general direction of the axis of the head, the body portion of each segment having a conical side surface coaxial with the axis of the head and a plane bottom surface perpendicular to the axis of said conical surface, said head having a conical side-seating surface coaxial with the head, against which the conical side surfaces of the segments are adapted to seat, and having a plane surface perpendicular to the axis of the head, upon which the bottom surfaces of the segments are adapted to seat, and means for securing the segments to the head.

8. A face-mill gear cutter comprising a rotary head and a plurality of cutting segments, each of the segments having a body portion and a plurality of cutting teeth which are integral with the body portion of the segment and which are adapted to project beyond one side face of the head in the general direction of the axis of the head, the body portion of each segment having a conical side surface coaxial with the head and a bottom surface lying in a plane perpendicular to the axis of said conical surface, said head having a conical side surface coaxial with the head and a locating surface lying in a plane perpendicular to the axis of the head, said segments being positioned on the head with their conical side surfaces engaging the conical side surface of the head and their bottom surfaces seating on the plane surface of the head, and means for securing the segments to the head.

9. A face-mill gear cutter comprising a rotary head and a plurality of cutting segments, each of the segments having a body portion and a plurality of cutting teeth which are integral with the body portion and which are adapted to project beyond one side face of the head in the general direction of the axis of the head, the body portion of each segment having a conical side surface coaxial with the head and a bottom surface lying in a plane perpendicular to the axis of said conical surface and each segment also having a plane end surface, said head haivng a conical side surface coaxial with the head and a locating surface lying in a plane perpendicular to the axis of the head and said head being slotted at angularly spaced intervals, one side of each slot being plane, a positioning member engageable in each slots and having a plane side surface to seat against the plane side of said slot and the plane face of a segment to position the segment angularly in the head, said segments being positioned on the head with their conical side surfaces engaging the conical side surface of the head and their bottom surfaces resting on said plane surface, and means for securing the segments to the head.

10. A face-mill gear cutter for cutting gears by continuous rotation of the cutter and intermittent indexing of the blank comprising a rotary head and a plurality of cutting segments, each of the segments having a plurality of integral cutting teeth which project beyond one side face of the head in the general direction of the axis of the head, the cutting teeth of successive segments being arranged so that corresponding side cutting edges of said teeth are at successively different radial distances from the axis of the cutter head and being further arranged so that there is a gap between the first and last teeth of the cutter so that a gear blank may be indexed while said gap is abreast of the blank in the rotation of the cutter, and means for securing the segments to the head.

11. A face-mill gear cutter for cutting gears by continuous rotation of the cutter and intermittent indexing of the blank comprising a rotary head and a plurality of cutting segments, each of the segments having a plurality of integral cutting teeth which project beyond one side face of the head in the general direction of the axis of the head, the side cutting edges of successive teeth of the segments being offset alternately and progressively in a radial direction toward and from the axis of the head, the last tooth being spaced from the first tooth a distance great enough to permit indexing of the blank during rotation of the cutter, and means for securing the segments to the head.

12. A face-mill gear cutter for cutting gears by continuous rotation of the cutter and intermittent indexing of the blank comprising a rotary head and a plurality of cutting segments, each of the segments having a plurality of integral cutting teeth which project beyond one side face of the head in the general direction of the axis of the head, the side cutting edges of successive teeth of the segments being offset alternately and progressively in a radial direction toward and from the axis of the head, the last two teeth being spaced from one another and the second last tooth being spaced from the next preceding tooth a distance greater than the width of face of a gear to be cut, and there being a gap between the last tooth and the first tooth to permit indexing the gear blank when said gap is abreast of the blank in the rotation of the cutter, and means for securing the segments to the cutter head.

13. A face-mill gear cutter comprising a rotary head and a plurality of cutting segments, the head being provided with a plurality of angularly spaced notches, one for each segment, each segment having a ground end face, a key having a ground side face engageable in each of said notches and adapted to engage an end face of a segment to locate the segment angularly on the head, and means for securing the segment to the head, the segments having integral teeth which extend beyond one side face of the head in the general direction of the axis of the head.

14. A face-mill gear cutter comprising a rotary head and a plurality of cutting segments, each of said segments having a body portion and a plurality of cutting teeth integral therewith, and means for securing the body portion of each segment to the periphery of the head so that its cutting teeth project beyond one side face of the head in the general direction of the axis of the head.

15. A face-mill gear cutter comprising a rotary head and a plurality of cutting segments, each of said segments having a body portion and a plurality of cutting teeth integral therewith, means for securing the body portion of each segment to the periphery of the head so that its cutting teeth project beyond one side face of the head in the general direction of the axis of the head, and means for locating each segment axially of the head.

16. A face-mill gear cutter comprising a rotary head and a plurality of cutting segments, each of said segments having a body portion and a plurality of cutting teeth integral therewith, means for securing the body portion of each segment to the periphery of the head so that its cutting teeth project beyond one side face of the head in the general direction of the axis of the head, and means for positioning each segment angularly about the axis of the head.

17. A face-mill gear cutter comprising a rotary head and a plurality of cutting segments, each of said segments having a body portion and a plurality of cutting teeth integral therewith, means for securing the body portion of each segment to the periphery of the head so that its cutting teeth project beyond one side face of the head in the general direction of the axis of the head, means for locating the axial position of each segment on the head, and means for locating the angular position of each segment about the axis of the head.

18. A cutting segment for gear cutters having a body portion and a plurality of cutting teeth integral therewith, said body portion being widest at its base and having a conical side surface and a plane locating surface which is radial of the axis of said conical side surface.

19. A cutting segment for gear cutters having a body portion and a plurality of cutting teeth integral therewith, said body portion being widest at its base and having arcuate side surfaces which converge towards its cutting portion.

20. A cutting segment for gear cutters having a body portion and a plurality of cutting teeth integral therewith, said body portion being widest at its base and having one side which is conical and which joins said base at an acute angle and having a plane locating surface which is radial of the axis of said conical side surface.

21. A cutting segment for gear cutters having an arcuate body portion and a plurality of cutting teeth integral therewith, said body portion having a plane bottom surface and a conical side surface which joins said bottom surface at an acute angle.

22. A face-mill gear cutter comprising a rotary head and a plurality of cutting segments, each of said segments having a body portion and a plurality of cutting teeth integral therewith, means for securing the body portion of each segment to the head so that its cutting teeth project beyond one side face of the head in the general direction of the axis of the head, said head being formed with an integral seat against which the base of the body portion of each segment is adapted to seat, when it is secured to the head, to locate the segment axially on the head.

23. A face-mill gear cutter comprising a rotary head and a plurality of cutting segments, each of said segments having a body portion and a plurality of cutting teeth integral therewith, said head having a plane seating surface perpendicular to its axis and each of said segments having a plane bottom face, means for securing the segments to the head so that their cutting teeth project beyond one side face of the head in the general direction of the axis of the head and their bottom faces seat on said plane seating surface.

24. A gear cutter comprising a rotary head and a plurality of cutting segments, each of said segments having a body portion and a plurality of cutting teeth integral therewith, said body portion having a conical side surface and said head having a cooperating conical seat surface, and means for securing the body portion of each segment to the head so that the conical side surface of the segment seats against the conical seating surface of the head and means for locating each segment angularly about the axis of the head.

25. A gear cutter comprising a rotary head and a plurality of cutting segments, each of the segments having a body portion and a plurality of cutting teeth integral therewith, means on the head against which the base of each segment seats, means for locating the position of each segment angularly about the axis of the head, and means for securing the segment to the head.

26. A gear cutter comprising a rotary head and a plurality of cutting segments, each of the segments having a body portion and a plurality of cutting teeth integral therewith, the body portion of each segment having a plane end face, means adapted to engage against said plane end face to locate each segment angularly about the axis of the head, means on the head against which the base of each segment seats, and means for securing the segments to the head.

27. A gear cutter comprising a rotary head and a plurality of cutting segments, each of said segments having a body portion and a plurality of cutting teeth integral therewith, said head having a plurality of angularly spaced slots, one for each segment, means secured in each slot and cooperating with each segment to locate the segment angularly about the axis of the head, means on the head against which the base of each segment seats, and means for securing the segments to the head.

28. A gear cutter comprising a rotary head and a plurality of cutting segments, each of said segments having a body portion and a plurality of cutting teeth integral therewith, the body portion of each segment having side and bottom faces formed at an acute angle to one another, said head having seating portions formed at a corresponding acute angle to one another to receive the body portions of said segments, each of said segments having a plane locating surface and said head having a plurality of locating members, each of which has a plane surface radial of the axis of said head which is adapted to cooperate with the plane locating surface of one of said segments to locate the position of the segment angularly about the axis of the head, and means for securing the body portions of the segments to the head.

29. A gear cutter comprising a rotary head and a plurality of cutting segments, each of said segments having a body portion and a plurality of cutting teeth integral therewith, the body portion of each segment having side and bottom faces formed at an acute angle to one another, said head having seats formed at a corresponding acute angle to one another to receive the body portions of said segments, means adapted to engage each segment to locate the segment angularly about the axis of the head, and means for securing the body portions of the segments to the head.

30. A face-mill gear cutter comprising a rotary head and a plurality of cutting segments, each of said segments having a body portion and a plurality of cutting teeth integral therewith, said head having a seating portion with a plane upper face perpendicular to the axis of the head and a conical side surface which forms an acute angle with said plane upper face, the body portions of said segments having corresponding plane bottom and conical side faces forming a corresponding acute angle to one another, and means for securing the segments to said head with the body portions thereof seated on the seating portion of the head.

31. A face-mill gear cutter for cutting gears by continuous rotation of the cutter and intermittent indexing of the blank comprising a rotary head and a plurality of cutting teeth which project beyond one side face of the head in the general direction of the axis of the head and are arranged part-way only around the periphery of the head with a gap between the last and first teeth to permit indexing of the gear blank when said gap is abreast of the blank in the rotation of the cutter, the last two teeth on said head being integral with one another and being sharpened to cut, respectively, opposite side tooth surfaces of the gear blank and having their side cutting edges offset radially, respectively, inwardly and outwardly with reference to corresponding side cutting edges of preceding teeth of the cutter.

32. A cutting segment for gear cutters having an arcuate body portion and a plurality of cutting teeth integral therewith, said body portion having a plane bottom surface and a conical side surface which joins said bottom surface at an acute angle, and said body portion having a plane locating surface which is radial of the axis of said conical side surface.

33. A cutting segment for gear cutters having a body portion and a plurality of cutting teeth integral therewith, said body portion having an arcuate side surface which is part of a surface of revolution, and a plane bottom surface which is perpendicular to the axis of said surface of revolution, and a plane locating surface which is radial of the axis of said surface of revolution.

JAMES E. GLEASON.